United States Patent
Hasegawa et al.

(10) Patent No.: US 8,928,664 B2
(45) Date of Patent: Jan. 6, 2015

(54) GRAPH CREATION METHOD AND GRAPH CREATION DEVICE

(75) Inventors: Yoshiya Hasegawa, Kawasaki (JP); Kouji Takahashi, Kawasaki (JP); Masamine Abe, Kawasaki (JP); Tomoyoshi Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 680 days.

(21) Appl. No.: 12/878,165

(22) Filed: Sep. 9, 2010

(65) Prior Publication Data

US 2011/0057928 A1    Mar. 10, 2011

(30) Foreign Application Priority Data

Sep. 10, 2009 (JP) ................................ 2009-209435

(51) Int. Cl.
| | | |
|---|---|---|
| G06T 11/20 | (2006.01) | |
| G09G 5/22 | (2006.01) | |
| G06Q 10/08 | (2012.01) | |
| G06Q 40/00 | (2012.01) | |
| G06Q 40/08 | (2012.01) | |
| G06Q 40/06 | (2012.01) | |
| G06Q 30/00 | (2012.01) | |

(52) U.S. Cl.
CPC ............ *G06T 11/206* (2013.01); *G06Q 10/087* (2013.01); *G06Q 40/00* (2013.01); *G06Q 40/08* (2013.01); *G06Q 40/06* (2013.01); *G06Q 30/00* (2013.01)
USPC ...................... 345/440; 345/440.1; 345/440.2

(58) Field of Classification Search
CPC ....... G06Q 40/06; G06Q 40/00; G06Q 40/08; G06Q 10/087; G06Q 30/0201; G06Q 10/0639; G06Q 30/00; G06Q 10/1053
USPC ..................................... 345/440, 440.1, 440.2
See application file for complete search history.

(56) References Cited

U.S. PATENT DOCUMENTS

| | | | |
|---|---|---|---|
| 6,211,887 B1* | 4/2001 | Meier et al. ................... | 345/440 |
| 7,290,212 B2* | 10/2007 | Fushimi et al. ............... | 715/731 |
| 7,408,554 B2* | 8/2008 | Lawson et al. ................ | 345/442 |
| 7,692,653 B1* | 4/2010 | Petro et al. .................... | 345/440 |
| 8,350,856 B1* | 1/2013 | Nazir et al. .................... | 345/440 |
| 2004/0070624 A1* | 4/2004 | Fushimi et al. ............... | 345/771 |
| 2005/0093866 A1* | 5/2005 | Ebert ............................. | 345/440 |
| 2007/0046675 A1* | 3/2007 | Iguchi et al. .................. | 345/441 |
| 2007/0183627 A1* | 8/2007 | Batinovich .................... | 382/100 |
| 2009/0094053 A1* | 4/2009 | Jung et al. ......................... | 705/2 |
| 2009/0138590 A1* | 5/2009 | Lee et al. ...................... | 709/224 |
| 2009/0231339 A1* | 9/2009 | Smith et al. ................... | 345/440 |
| 2012/0105453 A1* | 5/2012 | Cardno et al. ................ | 345/440 |

FOREIGN PATENT DOCUMENTS

| | | |
|---|---|---|
| JP | 4-168579 A | 6/1992 |
| JP | 9-305797 A | 11/1997 |
| JP | 2002-298147 A | 10/2002 |

* cited by examiner

*Primary Examiner* — Jeffrey Chow
(74) *Attorney, Agent, or Firm* — Oblon, Spivak, McClelland, Maier & Neustadt, L.L.P.

(57) ABSTRACT

A graph creation method includes setting on a plane a coordinate system in which three axis extend from an origin in a radial fashion, setting three evaluation results of three evaluation item for an evaluation object on each the three axis; determining a balance being one of center, circumcenter, incenter, orthocenter, and excenter of a polygon the vertices of which correspond to the three evaluation results set on the three axis; and creating on the coordinate system a graph in which the balance is set.

9 Claims, 14 Drawing Sheets

FIG. 4

| EVALUATION OBJECT ID | EVALUATION ITEM ID | EVALUATION ITEM | EVALUATION RESULT | EVALUATION TERM |
|---|---|---|---|---|
| P1 | H1 | CARBOHYDRATE | 1 | t1 |
| | H2 | PROTEIN | 4 | t1 |
| | H3 | FAT | 4 | t1 |
| P2 | H1 | CARBOHYDRATE | 2 | t1 |
| | H2 | PROTEIN | 0.5 | t1 |
| | H3 | FAT | 3 | t1 |
| P3 | H1 | CARBOHYDRATE | 2 | t1 |
| | H2 | PROTEIN | 2 | t1 |
| | H3 | FAT | 0.5 | t1 |

EVALUATION RESULT FILE — 400

400-1, 400-2, 400-3

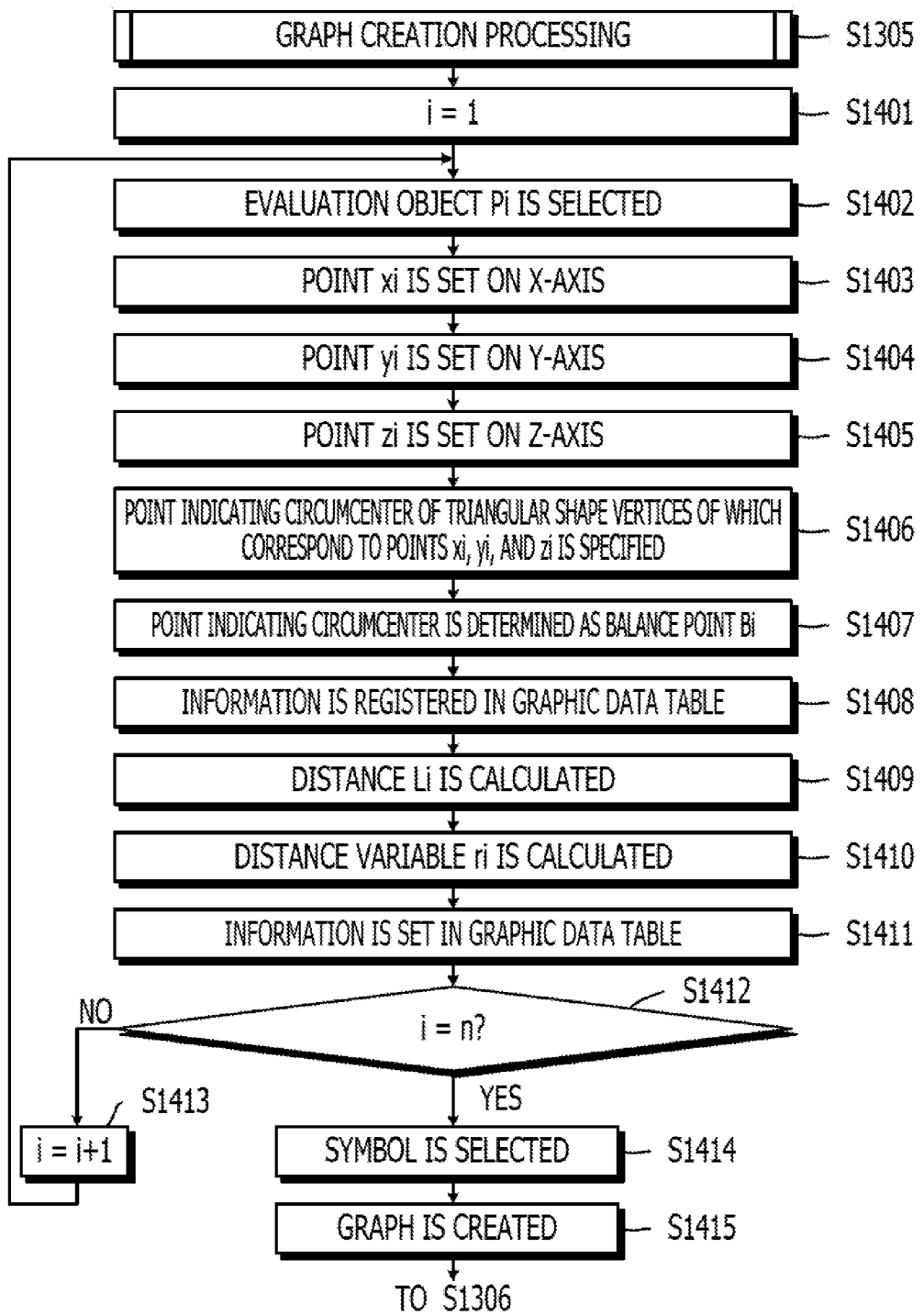

GRAPH CREATION METHOD AND GRAPH CREATION DEVICE

CROSS-REFERENCE TO RELATED APPLICATIONS

This application is based upon and claims the benefit of priority of the prior Japanese Patent Application No. 2009-209435, filed on Sep. 10, 2009, the entire contents of which are incorporated herein by reference.

FIELD

The embodiments discussed herein are related to a graph creation method, a graph creation device, and a storage medium storing a graph creation program.

BACKGROUND

Triangular graphs and radar charts have been used as methods in which results obtained by comprehensively evaluating evaluation objects with respect to multiple components (evaluation items) are indicated.

A triangular graph is a graph in which the individual sides of an equilateral triangle are used as three components for graphic representation and the proportions of these components are represented as the lengths of perpendicular lines drawn from a point in the equilateral triangle to individual sides of the equilateral triangle. In the triangular graph, it is assumed that the sum of the lengths of the perpendicular lines drawn from an arbitrary point in the equilateral triangle to the individual sides of the equilateral triangle is a constant value.

The radar chart is a regular polygon (or circular) graph obtained by drawing lines among values on numerical axes extending in a radial fashion. The radar chart is used when an overall balance is determined by comparing a plurality of items or the tendency of balance fluctuation accompanied with the change of the seasons or the elapse of time is analyzed on the basis of time-series data.

In addition, a technique used for displaying an object on a screen by adjusting the balance of a three-dimensional object arranged on a virtual space has been disclosed, for example, in Japanese Laid-open Patent Publication No. 09-305797. For example, upon receiving a position in a top view specified by a user, a three-dimensional layout editing device displays a front view seen from the position.

SUMMARY

According to an aspect of an embodiment, a graph creation method, includes: setting on a plane a coordinate system in which a first axis, a second axis, and a third axis extend from an origin in a radial fashion; setting on the first axis a first point that indicates an evaluation result of a first evaluation item for an evaluation object; setting on the second axis a second point that indicates an evaluation result of a second evaluation item for the evaluation object; setting on the third axis a third point that indicates an evaluation result of a third evaluation item for the evaluation object; determining, using a processor, a fourth point as a point that indicates, for the evaluation object, a balance among the evaluation result of the first evaluation item, the evaluation result of the second evaluation item, and the evaluation result of the third evaluation item, the fourth point being one of the center, the circumcenter, the incenter, the orthocenter, and the excenter of a polygon the vertices of which correspond to the first point, the second point, and the third point; and creating on the coordinate system a graph in which the fourth point is set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of an evaluation result file;

FIG. 14 is a flowchart illustrating an example of a graph creation processing operation performed in S1305 in FIG. 13.

DESCRIPTION OF EMBODIMENTS

In the technique for displaying an object on a screen mentioned in the Background, when there are a plurality of evaluation objects, there is a problem in which it is difficult to display (plot) balances among multiple components for all the evaluation objects while results for all the evaluation objects are collectively presented with respect to the multiple components (evaluation items).

For example, a radar chart is created by plotting data on axes extending in a radial fashion and, after that, drawing straight lines among data points located adjacent to one another. When there are a plurality of evaluation objects, graph lines for individual evaluation objects overlap one another in the radar chart. Therefore, in the radar chart, it is difficult to determine individual evaluation results.

In addition, for example, in a triangular graph, it is assumed that the sum of the lengths of the perpendicular lines drawn from an arbitrary point in the equilateral triangle to the individual sides of the equilateral triangle, that is, the sum of individual components, is a constant value. Therefore, it is difficult for the triangular graph to be applied to the evaluation of components having no relationship.

To deal with such a problem, embodiments of a balance graph creation method, a balance graph creation device, and a storage medium storing a balance graph creation program will be described hereinafter with reference to figures attached.

Figure 1:
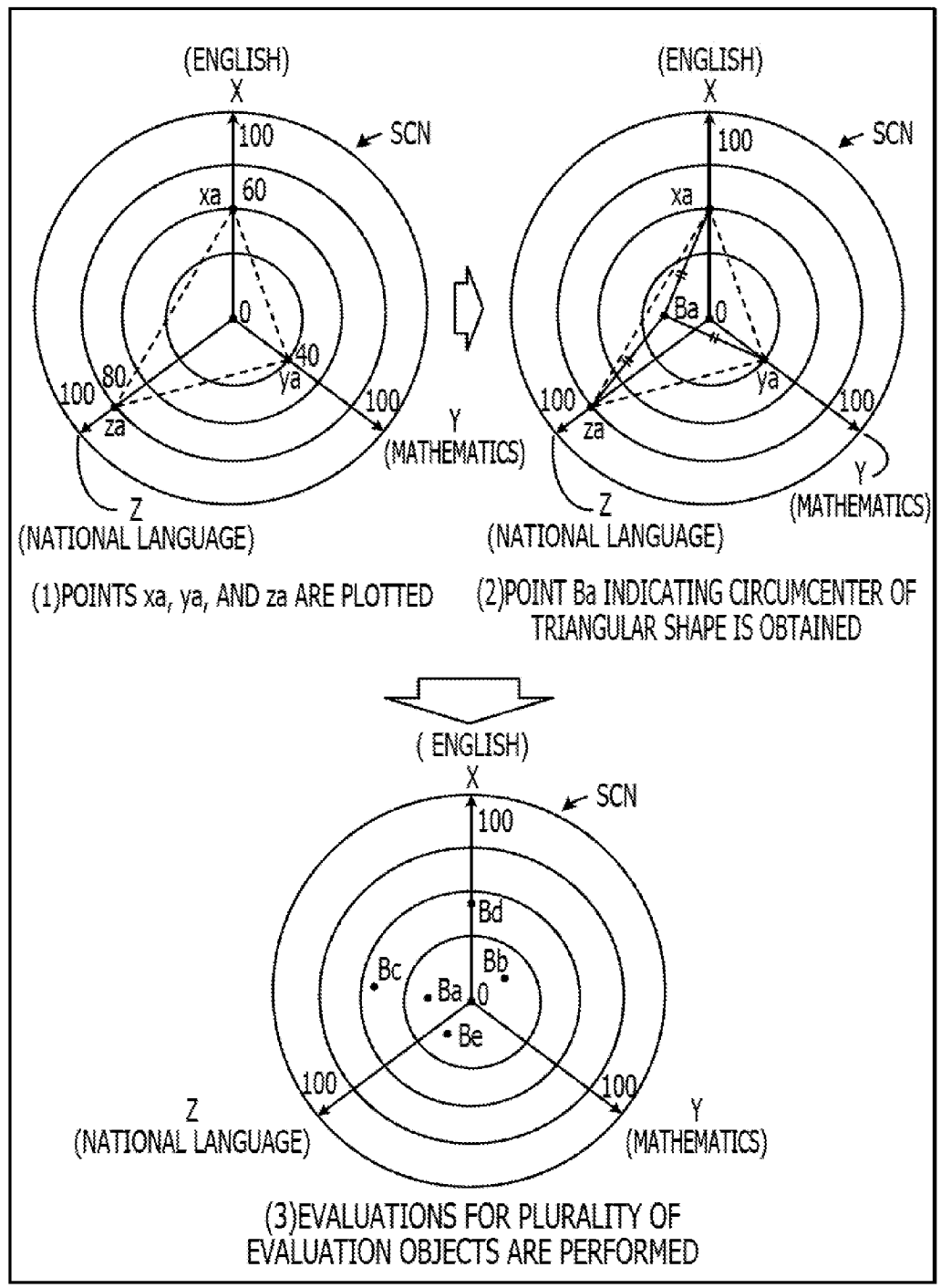
FIG. 1 illustrates an example of an embodiment.

First, an example of the embodiment will be described. FIG. 1 illustrates an example of the embodiment. Here, a case is assumed in which the academic ability balances of students A, B, C, D, and E are evaluated on the basis of the individual evaluation results of English, mathematics, and national language for the students A, B, C, D, and E. In this case, the evaluation objects are the "students A to E", and the evaluation items are "English", "mathematics", and "national language".

In FIG. 1, plotted on a circular plane (referred to as "screen SCN" hereinafter) is a coordinate system in which an X-axis (English), a Y-axis (mathematics), and a Z-axis (national language), which correspond to individual evaluation items, are extended from an origin in a radial fashion. The screen SCN is a circular plane the radius of which corresponds to a maximum value R (R=100 here) in the evaluation results of the individual evaluation items. In addition, angles among the axes are 120 degrees.

Here, it is assumed that, for the student A, the evaluation result of "English" is "60", the evaluation result of "mathematics" is "40", and the evaluation result of "national language" is "80". An example of procedures according to the embodiment will be described hereinafter.

(1) In the embodiment, with respect to the student A, points xa, ya, and za, which indicate the evaluation results of the individual evaluation items, are plotted on axes corresponding to the individual evaluation items, respectively. Here, the coordinates of the point xa are (X, Y, Z)=(60, 0, 0). The coordinates of the point ya are (X, Y, Z)=(0, 40, 0). The coordinates of the point za are (X, Y, Z)=(0, 0, 80).

(2) In the embodiment, a point Ba that indicates the circumcenter of a triangular shape the vertices of which are the points xa, ya, and za is obtained and plotted on the screen SCN. Here, the circumcenter of the triangular shape is at substantially the same distance from the individual points xa, ya, and za, and indicates the center of the triangular shape. Accordingly, the point Ba indicating the circumcenter is treated as a point indicating a balance among the evaluation results for the multiple evaluation items.

(3) In the embodiment, with respect to other students B to E, balance points Bb to Be are also plotted on the screen SCN, by repeating the operations (1) and (2) in substantially the same way as in the case of the student A. In this way, in the embodiment, with respect to each of the individual students A to E, plotted is one point into which the balance among the evaluation results of the multiple evaluation items is aggregated.

Accordingly, with respect to the individual students A to E, visibility can be improved when the balances among the evaluation results of the multiple evaluation items are evaluated. In addition, since the balance points Ba to Be are collectively presented with respect to the individual students A to E, a user's intuitive understanding can be supported when the tendencies of the balances for all the evaluation objects are determined.

(Hardware Configuration of Balance Graph Creation Device)

Figure 2:
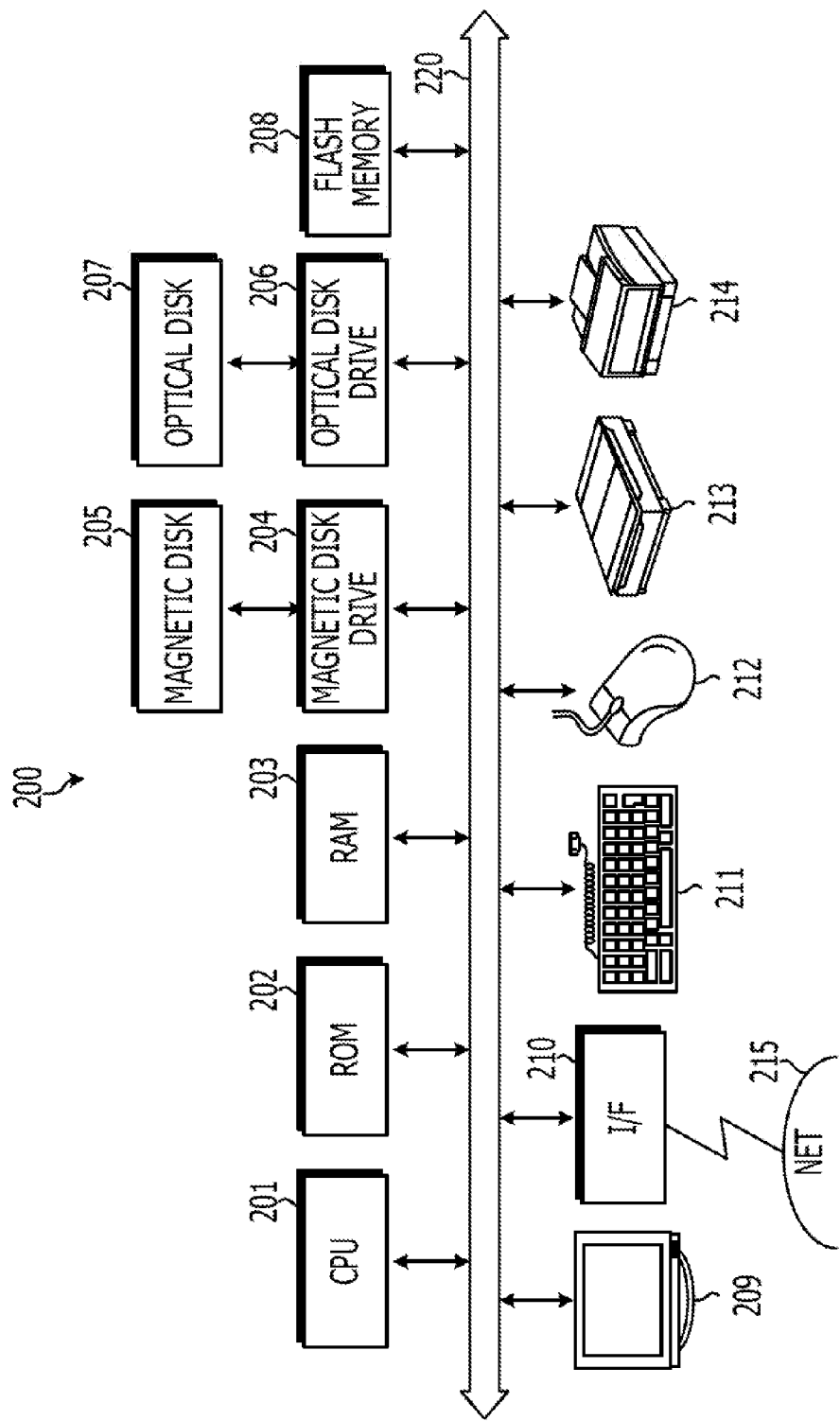
FIG. 2 illustrates an example of a hardware configuration of a balance graph creation device.

Next, an example of the hardware configuration of a balance graph creation device according to the embodiment will be described. FIG. 2 illustrates the example of the hardware configuration of the balance graph creation device. In FIG. 2, a balance graph creation device 200 includes a central processing unit (CPU) 201, a read-only memory (ROM) 202, a random access memory (RAM) 203, a magnetic disk drive 204, a magnetic disk 205, an optical disk drive 206, an optical disk 207, a flash memory 208, a display 209, an interface (I/F) 210, a keyboard 211, a mouse 212, a scanner 213, and a printer 214. In addition, the individual configuration sections are connected to one another through the bus 220.

Here, the CPU 201 controls the whole balance graph creation device 200. The ROM 202 stores a program such as a boot program or the like. The RAM 203 is used as the work area of the CPU 201. The magnetic disk drive 204 controls the reading/writing of data from and to the magnetic disk 205 in accordance with the control of the CPU 201. The magnetic disk 205 stores data written in accordance with the control of the magnetic disk drive 204.

The optical disk drive 206 controls the reading/writing of data from and to the optical disk 207 in accordance with the control of the CPU 201. The optical disk 207 stores data written in accordance with the control of the optical disk drive 206, and causes a computer to read data stored in the optical disk 207. The flash memory 208 is a nonvolatile semiconductor memory in which data is rewritable.

The display 209 displays data such as a cursor, an icon, a toolbox, a document, an image, and function information or the like. A CRT, a TFT liquid crystal display, or a plasma display can be adopted as the display 209.

The I/F 210 is connected through a communication line to a network 215 such as a local area network (LAN), a wide area network (WAN), Internet or the like, and is connected to other devices through the network 215. In addition, the I/F 210 controls the network 215 and an internal interface, and controls the input-output of data from and to an external device. For example, a modem or LAN adapter can be adopted as the I/F 210.

The keyboard 211 includes keys used for inputting characters, number symbols, and various kinds of instructions, and performs data input. In addition, in place of the keyboard 211, a touch-panel input pad or a numerical keypad may be used. The mouse 212 performs the movement of the cursor, the selection of a range, the movement of a window, and the modification of a window size or the like. A trackball or a joystick having substantially the same function as the mouse 212, as a pointing device, may be adopted.

The scanner 213 optically reads an image and loads image data into the balance graph creation device 200. In addition, the scanner 213 may include an optical character reader (OCR) function. In addition, the printer 214 prints image data and document data. A laser printer or an ink-jet printer may be adopted as the printer 214, for example.

(Functional Configuration of Balance Graph Creation Device)

Figure 3:
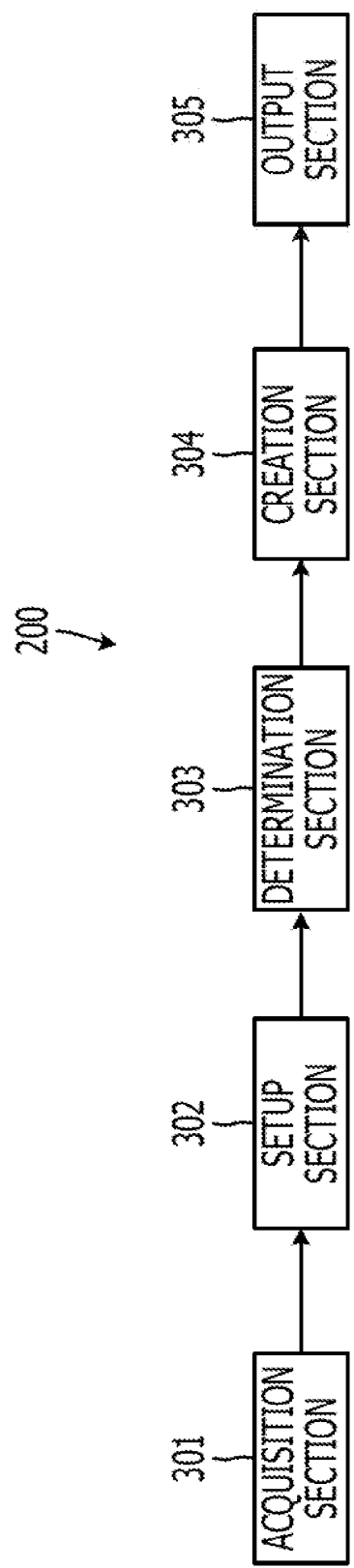
FIG. 3 illustrates an example of a functional configuration of the balance graph creation device.

Next, the functional configuration of the balance graph creation device will be described. FIG. 3 illustrates an example of the functional configuration of the balance graph creation device. In FIG. 3, the balance graph creation device 200 includes an acquisition section 301, a setup section 302, a determination section 303, a creation section 304, and an output section 305. For example, a function as the control section (the acquisition section 301 to the output section 305) is realized by causing the CPU 201 to perform a program stored in a storage device such as the ROM 202, the RAM 203, the magnetic disk 205, the optical disk 207, or the flash memory 208, shown in FIG. 2, or is realized using the I/F 210.

The acquisition section 301 includes a function for acquiring evaluation results relating to multiple evaluation items. Here, the evaluation items are components used for evaluating an evaluation object. Examples of the evaluation items include "risk, measure, and investment" in the balance evaluation of information security measures, "English, mathematics, and national language" in the balance evaluation of academic ability, and "carbohydrate, protein, and fat" in the balance evaluation of nutrients or the like.

For example, the acquisition section 301 may acquire evaluation results relating to the multiple evaluation items (refer to FIG. 4) on the basis of the manipulation input of a user using the keyboard 211 or the mouse 212, shown in FIG. 2. In addition, the acquisition section 301 may acquire evaluation results extracted from a database or a library, and, furthermore, acquire evaluation results from an external device through the network 215.

In addition, the acquisition section 301 may collectively acquire evaluation results relating to a plurality of evaluation objects. The evaluation results acquired are stored in a storage area such as the RAM 203, the magnetic disk 205, the optical disk 207, the flash memory 208 or the like. Here, pointing to the balance evaluation of nutrients included in daily food, an example of evaluation results relating to the multiple evaluation items will be described.

In this regard, in the following description, a plurality of evaluation objects are referred to as "evaluation objects P1 to Pn", and an arbitrary evaluation object is referred to as "evaluation object Pi" (i=1, 2, ..., n).

FIG. 4 illustrates an example of an evaluation result file. In FIG. 4, an evaluation result file 400 includes pieces of evaluation result data 400-1 to 400-3 corresponding to the evaluation objects P1 to P3 respectively. For example, each of the pieces of evaluation result data 400-1 to 400-3 includes information relating to an evaluation object ID, an evaluation item ID, an evaluation item, an evaluation result, and an evaluation term.

The evaluation object ID is an identifier used for identifying an evaluation object Pi (for example, the name of a company, the name of a person, and the name of a facility or the like). The evaluation item ID is an identifier used for identifying an evaluation item. The evaluation item is the name of an evaluation item. The evaluation result is the evaluation result of an evaluation item for the evaluation object Pi. The evaluation term is information used for identifying a term when the evaluation object Pi has been evaluated (for example, day and time information).

Here, pointing to the evaluation result data 400-1, as an example, evaluation results relating to the evaluation items H1 to H3 of the evaluation object P1 are carbohydrate="1", protein="4", and fat="4". In addition, the evaluation term of the evaluation result data 400-1 is "t1".

In addition, in the description of the embodiment, it is assumed that the degree of sufficiency for the evaluation item increases linearly with the value of the evaluation result. However, the embodiment is not limited to the example. Namely, for example, when it is assumed that the degree of insufficiency for the evaluation item increases linearly with the value of the evaluation result, the "degree of insufficiency" and the "degree of sufficiency" may be used in place of the "degree of sufficiency" and the "degree of insufficiency" in the following description, respectively.

In addition, in the description of the embodiment, it is assumed that the evaluation results that have been evaluated are acquired. However, the embodiment is not limited to the example. Namely, for example, it may be assumed that, in the balance graph creation device 200, by assigning data on which an evaluation is based to individual evaluation formulas corresponding to individual evaluation items, evaluation results relating to the evaluation items are acquired. In this time, for example, it may be assumed that the evaluation results are acquired so as to compare the multiple evaluation items with substantially the same value scale. For example, it may be assumed that, in order to express the multiple evaluation items, which have different unit systems or the like, in one coordinate system, a data group on which an evaluation is based is weighted every evaluation item and handled.

For example, the data on which an evaluation is based includes the amounts [g] of carbohydrate intake, protein intake, and fat intake that the evaluation object Pi consumes in daily food. In addition, on the basis of the manipulation input of the user, the acquisition section 301 may acquire the data on which an evaluation is based. In addition, regarding the data on which an evaluation is based, the acquisition section 301 may acquire the data extracted from a database or a library, and, furthermore, acquire the data from an external device through the network 215.

Returning to the description of FIG. 3, the setup section 302 has a function for plotting a coordinate system (referred to as "coordinate system C", hereinafter) in which axes corresponding to evaluation items respectively extend from an origin in a radial fashion. For example, by referring to the evaluation result file 400, the setup section 302 plots on the screen SCN the coordinate system C in which the axes corresponding to the evaluation items H1 to H3 respectively extend from the origin in a radial fashion.

In addition, the setup section 302 has a function for plotting points, which indicate the acquired evaluation results of evaluation items, on the axes of the coordinate system C, the axes corresponding to the evaluation items, respectively. For example, the setup section 302 plots the evaluation results of the evaluation items H1 to H3 on the axes corresponding to the evaluation items H1 to H3, respectively. In addition, the plotted results are stored in a storage area such as the RAM 203, the magnetic disk 205, the optical disk 207, the flash memory 208 or the like.

Here, angles among the axes can be set arbitrarily. For example, the angles among the axes may be set to substantially the same angular degree. In addition, an angle between specific axes may be set to an angular degree different from the remaining angles among the axes. For example, an angle between axes having a correlation between evaluation items may be set to a smaller angular degree (a larger angular degree).

In addition, the angles among the axes may be set by the user or automatically. When the angles among the axes are set automatically, the setup section 302 may plot the angles among the axes in accordance with an angle pattern preliminarily set, for example. In addition, the setup section 302 may plot the angles among the axes, which are obtained on the basis of predetermined coefficients indicating correlations among evaluation items.

In addition, in the coordinate system C, the setup section 302 may assign the minimum values of evaluation results that relate to the multiple evaluation items to the origin, and assign the maximum values of the evaluation results to other end points, different from the origins of the individual axes. Accordingly, a balance graph that emphasizes the degrees of sufficiency (or the degrees of excessiveness) relating to the evaluation items can be created (refer to FIG. 7).

In addition, in the coordinate system C, the setup section 302 may assign the maximum value of evaluation results that relate to the multiple evaluation items to the origin, and assign the minimum value of the evaluation results to other end points (referred to as screen end, hereinafter), different from the origins of the individual axes. Accordingly, a balance graph that emphasizes the degrees of insufficiency relating to the evaluation items can be created (refer to FIG. 8).

In addition, the maximum values and minimum values of the evaluation results may correspond to the maximum values and minimum values of the individual evaluation items, or be represented by the maximum value and minimum value of all the evaluation items. In addition, whether the degrees of sufficiency or the degrees of insufficiency, relating to the evaluation items, are emphasized is preliminarily set by the user.

The determination section 303 has a function for determining a point (referred to as "balance point", hereinafter), which indicates the degree of balance (balance) among the evaluation results of the multiple evaluation items for an evaluation object, on the basis of the coordinates of a plurality of points plotted on the individual axes. For example, as the balance point, the determination section 303 determines one of the center, the circumcenter, the incenter, the orthocenter, and the excenter of a polygon the vertices of which correspond to a plurality of points plotted for individual evaluation items.

In addition, there has been a specific method in which the center, the circumcenter, the incenter, the orthocenter, and the excenter of a polygon are obtained on the basis of the coordinates of individual points in the coordinate system C. Therefore, the description of the specific method will be omitted. A determination result determined is stored in a graphic data table 500 shown in FIG. 5, for example. Here, an example of the memory content of the graphic data table 500 will be described.

Figure 5:
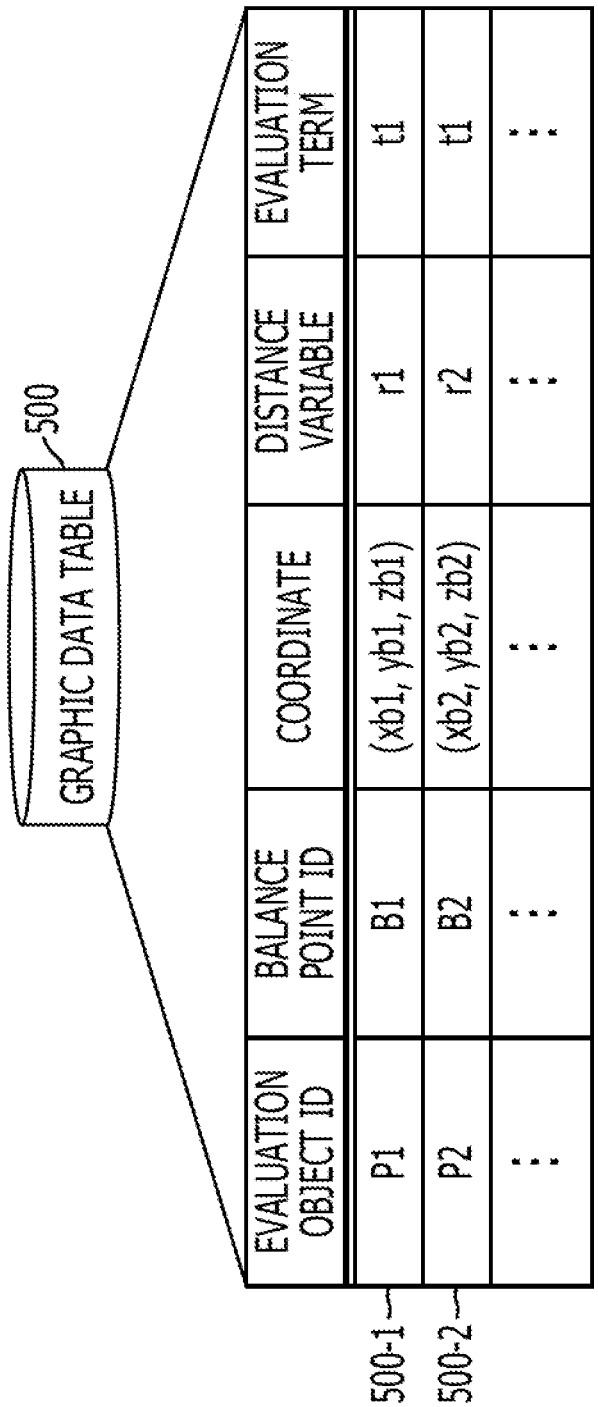
FIG. 5 illustrates an example of memory content of a graphic data table.

FIG. 5 illustrates an example of the memory content of a graphic data table. In FIG. 5, the graphic data table 500 includes the fields of an evaluation object ID, a balance point ID, a coordinate, a distance variable, and an evaluation term. By setting information in the individual fields, graphic data (for example, pieces of graphic data 500-1 and 500-2) is stored as a record.

The evaluation object ID is an identifier used for identifying the evaluation object Pi. The balance point ID is an identifier used for identifying the balance point of the individual evaluation object Pi. The coordinate is the coordinate of the balance point in the coordinate system C. The distance variable is a variable used for specifying the size of a symbol described below. The evaluation term is information used for specifying a term when the evaluation object Pi has been evaluated.

By setting information in the fields of the evaluation object ID, the balance point, the coordinate, and the evaluation term in the graphic data table 500, the determination section 303 registers new graphic data as a record. In addition, for example, the graphic data table 500 is stored in a storage area such as the RAM 203, the magnetic disk 205, the optical disk 207, the flash memory 208 or the like.

The creation section 304 has a function for creating a balance graph in which the determined balance point is expressed in the coordinate system C. For example, the creation section 304 may create the balance graph where a symbol the center of which corresponds to the balance point is expressed in the coordinate system C. Here, examples of the symbol include a figure, a symbol, and a character.

Figure 6:
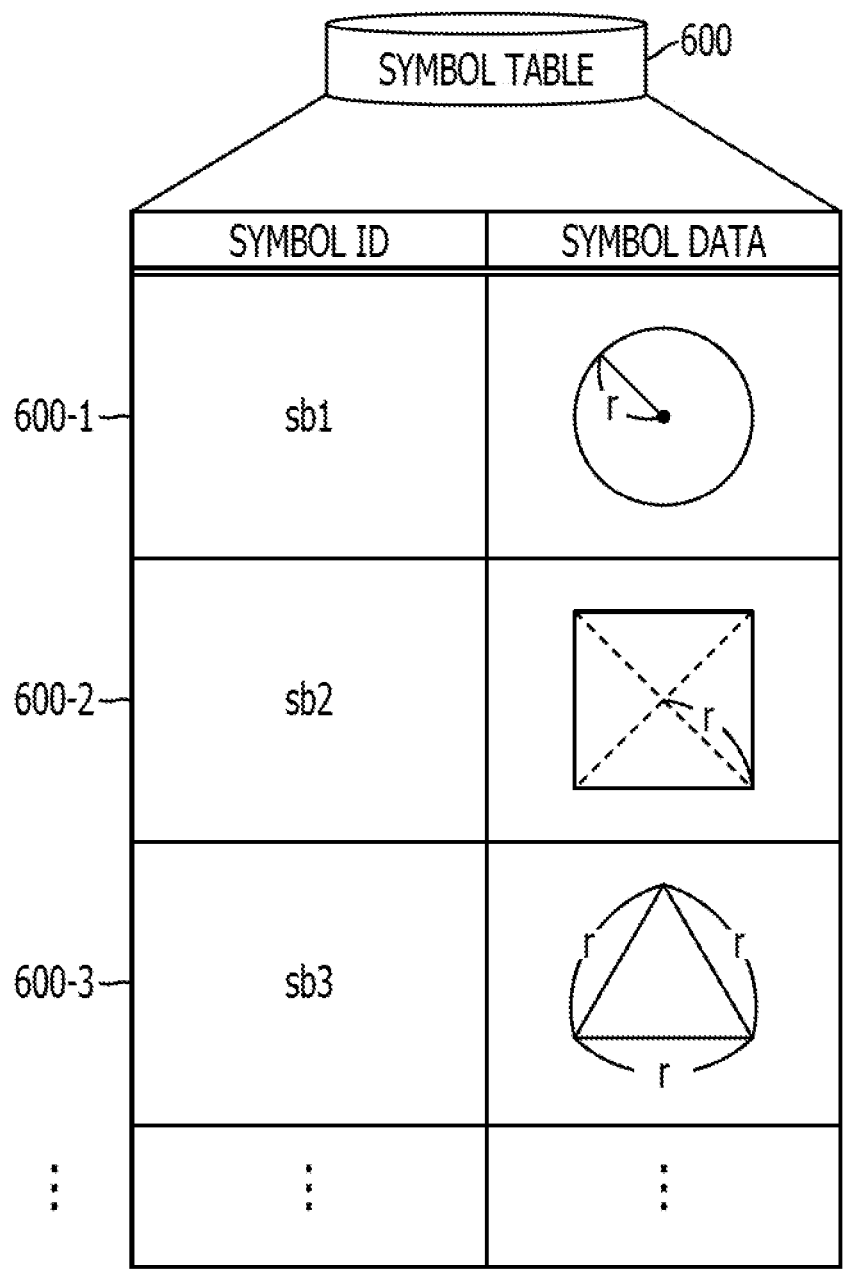
FIG. 6 illustrates an example of memory content of a symbol table.

For example, by referring to a symbol table 600 shown in FIG. 6, the creation section 304 creates the balance graph where a symbol the center of which corresponds to the balance point is expressed in the coordinate system C. At this time, the creation section 304 may select an arbitrary symbol from the symbol table 600. In addition, the creation section 304 may select a symbol preliminarily specified by the user.

FIG. 6 illustrates an example of the memory content of a symbol table. In FIG. 6, the symbol table 600 includes the fields of a symbol ID and a symbol data. By setting information in the individual fields, symbol information (for example, pieces of symbol information 600-1 to 600-3) is stored as a record.

The symbol ID is an identifier used for identifying the symbol. The symbol data is information used for plotting and expressing the symbol on the balance graph. In addition, "r" spelt and attached to each of the symbols is a distance variable varying in response to a distance L mentioned later.

Here, a symbol sb1 is a circular symbol, a symbol sb2 is a square symbol, and a symbol sb3 is an equilateral-triangular symbol. For example, the symbol table 600 is stored in a storage area such as the RAM 203, the magnetic disk 205, the optical disk 207, or the flash memory 208.

In addition, in the following description, the balance point of the evaluation object Pi is referred to as "balance point Bi", and a symbol the center of which corresponds to the balance point Bi is referred to as "symbol Si".

Returning to the description of FIG. 3, the creation section 304 may determine the size of the symbol Si on the basis of the sum of distances (referred to as "distance Li", hereinafter) between the balance point Bi and individual points that are plotted on the axes and indicate evaluation results. Here, the distance Li may be the average value of distances between the balance point Bi and the individual points. As the average value, for example, any one of arbitrary average values that are known, including the arithmetic average of and the geometric average of distances between the balance point Bi and the individual points, is adoptable and can be calculated on the basis of the distances between the balance point Bi and the individual points.

For example, the creation section 304 may determine the size of the symbol Si by calculating a distance variable ri with the following equation (1) or (2). In this regard, "ri" is the distance variable of the symbol Si, and "k" is an arbitrary constant.

$$ri = k/Li \qquad (1)$$

$$ri = k*Li \qquad (2)$$

For example, when the symbol Si is enlarged in inverse proportion to the distance Li, the distance variable ri is calculated using the equation (1). On the other hand, when the symbol Si is enlarged in proportion to the distance Li, the distance variable ri is calculated using the equation (2).

As an example, a value scale is assumed in which the reliability of evaluation increases linearly with the value of an evaluation result. Here, when the minimum value of an evaluation result is arranged at the origin, the distance Li has a tendency to increase linearly with the evaluation results of individual evaluation items. Accordingly, in the case in which a balance graph that emphasizes the degrees of sufficiency is created, when a poor evaluation result is to be emphasized, the equation (1) is used so that the distance variable ri decreases linearly with the distance Li. In addition, the symbol Si draws nearer the origin as a balance among the evaluation results of the multiple evaluation items is improved. Therefore, when the size of a symbol corresponding to a better evaluation result is decreased, visibility is improved at the time when a plurality of symbols Si are displayed.

On the other hand, when the maximum value of an evaluation result is arranged at the origin, the distance Li has a tendency to decrease linearly with the evaluation results of individual evaluation items. Accordingly, in the case in which a balance graph that emphasizes the degrees of insufficiency is created, when a poor evaluation result is to be emphasized, the equation (2) is used so that the distance variable ri increases linearly with the distance Li. In addition, for example, the calculated distance variable ri is set in the distance variable field of a corresponding record in the graphic data table 500.

In addition, on the basis of the distance Li, the creation section 304 may determine a color (brightness and color saturation are included) used when the symbol Si is plotted. For example, the creation section 304 may increase the brightness of the color of the symbol Si linearly with the distance Li. In addition, the creation section 304 may decrease the brightness of the color of the symbol Si linearly with the distance Li.

In addition, as the result of a plurality of balance graphs created in different evaluation terms, the creation section 304 may create a time-series balance graph in which the plurality of balance graphs are arranged in a time-series manner. Here, an evaluation term can be identified on the basis of evaluation results (for example, the evaluation result data 400-1) from which the individual balance graphs are created.

For example, by referring to the graphic data table 500, the creation section 304 creates the balance graphs corresponding to the evaluation terms, respectively. In addition, the creation section 304 creates the time-series balance graph by arranging the plurality of created balance graphs in a time-series manner. In addition, a creation example of a balance graph will be described using FIGS. 7 and 8. The creation result is stored in a storage area such as the RAM 203, the magnetic disk 205, the optical disk 207, the flash memory 208 or the like.

The output section 305 has a function for outputting the created balance graph. For example, the output section 305 may output a balance graph 900 shown in FIG. 9. In addition, the output section 305 may output a time-series balance graph 1000 shown in FIG. 10. In addition, examples of output formats include a case in which the display 209 displays the created balance graph, a case in which the printer 214 prints out the created balance graph, and a case in which the I/F 210 transmits the created balance graph to an external device. In addition, the created balance graph may be stored in a storage area such as the RAM 203, the magnetic disk 205, the optical disk 207, the flash memory 208 or the like.

(First Creation Example of Balance Graph)

Next, as an example, pointing to the evaluation result data 400-1 of the evaluation object P1, shown in FIG. 4, a creation example of a balance graph where the symbol S1 the center of which corresponds to the balance point B1 is expressed in the coordinate system C will be described.

Figure 7:
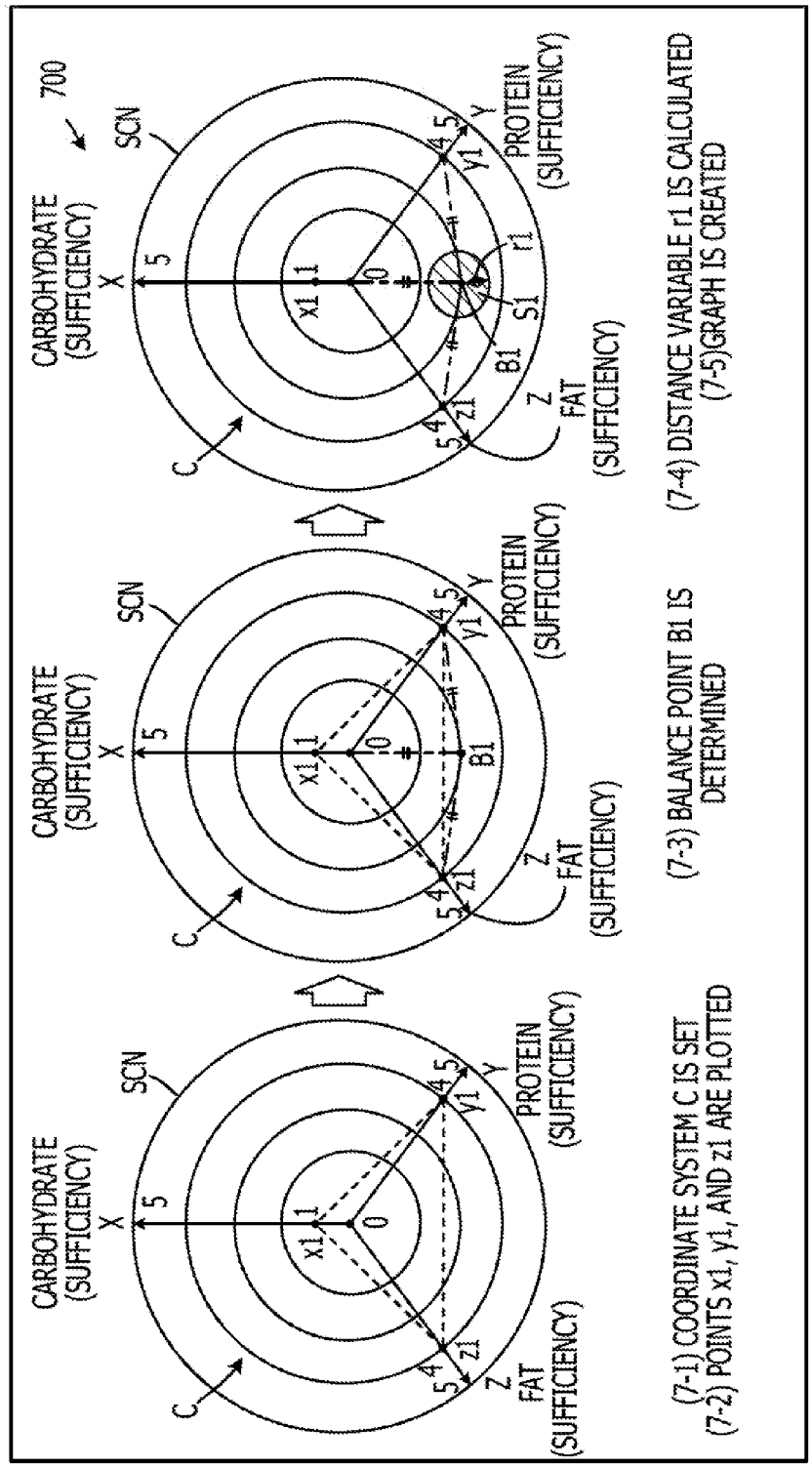
FIG. 7 illustrates a first creation example of a balance graph.

FIG. 7 illustrates a first creation example of the balance graph. Here, first, the case in which the minimum values (defined as "0", here) of evaluation results relating to multiple evaluation items are assigned to an origin and the maximum values (defined as "5", here) of the evaluation results are assigned to screen ends will be described.

(7-1) By referring to the evaluation result data 400-1, the setup section 302 sets on the screen SCN the coordinate system C in which axes corresponding to the evaluation items H1 to H3 respectively extend from an origin G in a radial fashion. Here, a coordinate system C, which includes an X-axis (carbohydrate), a Y-axis (protein), and a Z-axis (fat), is set. In addition, here, the minimum values (defined as "0", here) of evaluation results relating to the multiple evaluation items are assigned to the origin G and the maximum values (defined as "5", here) of the evaluation results are assigned to the screen ends. Therefore, a balance graph that emphasizes the degrees of sufficiency relating to the individual evaluation items turns out to be created. The processing operation corresponds to processing operations performed in S1302 to S1304 shown in FIG. 13, mentioned later.

(7-2) By referring to the evaluation result data 400-1, the setup section 302 sets on the X-axis a point x1 (1, 0, 0) indicating the evaluation result "1" of the carbohydrate. In addition, the setup section 302 sets on the Y-axis a point y1 (0, 4, 0) indicating the evaluation result "4" of the protein. In addition, the setup section 302 sets on the Z-axis a point z1 (0, 0, 4) indicating the evaluation result "4" of the fat. The processing operation corresponds to processing operations performed in S1403 to S1405 shown in FIG. 14, mentioned later.

(7-3) As the balance point B1, the determination section 303 determines a point indicating the circumcenter of a triangular shape the vertices of which correspond to the plurality of points x1, y1, and z1 arranged for the evaluation items H1 to H3 respectively. The processing operation corresponds to processing operations performed in S1406 and S1407 shown in FIG. 14, mentioned later.

(7-4) By substituting the distance Li between the balance point B1 and the individual points x1, y1, and z1 into the equation (1), the creation section 304 calculates the distance variable r1. Here, when it is assumed that the constant k in the equation (1) is equal to "3.2", the distance variable r1 turns out to be "0.8". The processing operation corresponds to processing operations performed in S1409 and S1410 shown in FIG. 14, mentioned later.

(7-5) By reading out the symbol information 600-1 from the symbol table 600, the creation section 304 creates a balance graph where the symbol S1 the center of which corresponds to the balance point B1 is expressed in the coordinate system C. Here, the distance variable r1 of the symbol S1 turns out to be the value "0.8" calculated in the processing operation (7-4). The processing operation corresponds to processing operations performed in S1414 to S1415 shown in FIG. 14, mentioned later.

Accordingly, a balance graph 700 in which, using one point (balance point B1), a balance among the evaluation results of the multiple evaluation items H1 to H3 for an evaluation object is expressed in the coordinate system C. The balance graph 700 illustrates that the degrees of sufficiency of the protein and the fat for the evaluation object P1 are high. In addition, when there are a plurality of evaluation objects, the series of processing operations (7-2) to (7-5) are repeated for the individual evaluation objects.

(Second Creation Example of Balance Graph)

Figure 8:
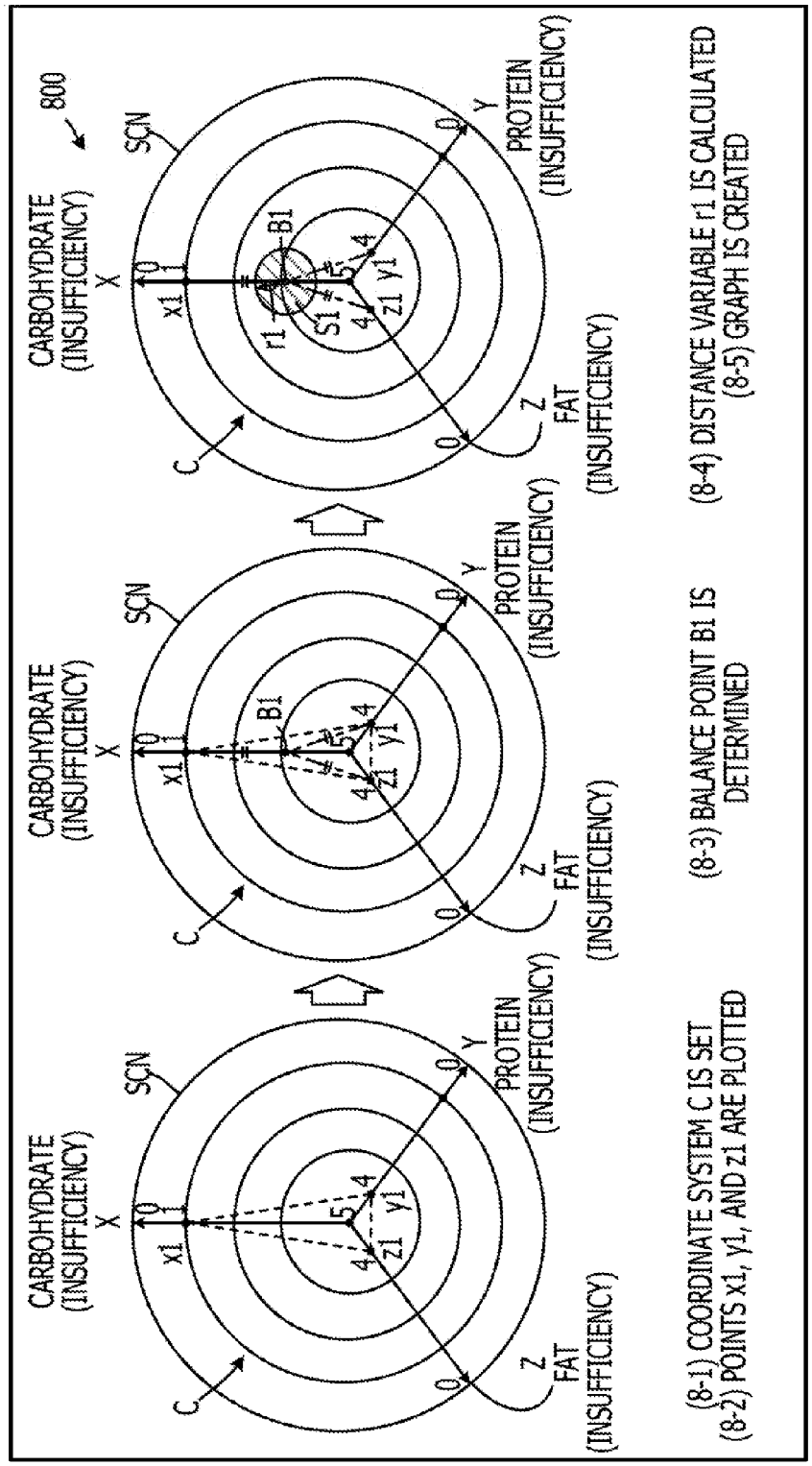
FIG. 8 illustrates a second creation example of a balance graph.

FIG. 8 illustrates a second creation example of the balance graph. Next, the case in which the maximum values (defined as "5", here) of evaluation results relating to the multiple evaluation items are assigned to an origin and the minimum values (defined as "0", here) of the evaluation results are assigned to screen ends will be described.

(8-1) By referring to the evaluation result data 400-1, the setup section 302 plots on the screen SCN the coordinate system C in which axes corresponding to the evaluation items H1 to H3 respectively extend from an origin G in a radial fashion. Here, plotted is a coordinate system C including an X-axis (carbohydrate), a Y-axis (protein), and a Z-axis (fat). In addition, here, the maximum values (defined as "5", here) of evaluation results relating to the multiple evaluation items are assigned to the origin G and the minimum values (defined as "0", here) of the evaluation results are assigned to the screen ends. Therefore, a balance graph that emphasizes the degree of insufficiency relating to the individual evaluation items turns out to be created. The processing operation corresponds to processing operations performed in S1302 to S1304 shown in FIG. 13, mentioned later.

(8-2) By referring to the evaluation result data 400-1, the setup section 302 sets on the X-axis a point x1 (1, 0, 0) indicating the evaluation result "1" of the carbohydrate. In addition, the setup section 302 sets on the Y-axis a point y1 (0, 4, 0) indicating the evaluation result "4" of the protein. In addition, the setup section 302 sets on the Z-axis a point z1 (0, 0, 4) indicating the evaluation result "4" of the fat. The processing operation corresponds to processing operations performed in S1403 to S1405 shown in FIG. 14, mentioned later.

(8-3) As the balance point B1, the determination section 303 determines a point indicating the circumcenter of a triangular shape the vertices of which correspond to a plurality of points x1, y1, and z1 arranged for the evaluation items H1 to H3 respectively. The processing operation corresponds to processing operations performed in S1406 and S1407 shown in FIG. 14, mentioned later.

(8-4) By substituting the distance Li between the balance point B1 and the individual points x1, y1, and z1 into the equation (2), the creation section 304 calculates the distance variable r1. Here, when it is assumed that the constant k in the equation (2) is equal to "0.4", the distance variable r1 turns out to be "0.8". The processing operation corresponds to processing operations performed in S1409 and S1410 shown in FIG. 14, mentioned later.

(8-5) By reading out the symbol information 600-1 from the symbol table 600, the creation section 304 creates a balance graph where the symbol S1 the center of which corresponds to the balance point B1 is expressed in the coordinate system C. Here, the distance variable r1 of the symbol S1 turns out to be the value "0.8" calculated in the processing operation (8-4). The processing operation corresponds to processing operations performed in S1414 and S1415 shown in FIG. 14, mentioned later.

Accordingly, a balance graph 800 in which, using one point (balance point B1), a balance among the evaluation results of the multiple evaluation items H1 to H3 for an evaluation object is expressed in the coordinate system C. The balance graph 800 illustrates that the degree of insufficiency of the carbohydrate for the evaluation object P1 is high. In addition, when there are a plurality of evaluation objects, the series of processing operations (8-2) to (8-5) are repeated for the individual evaluation objects.

(Display Example of Balance Graph)

Figure 9:
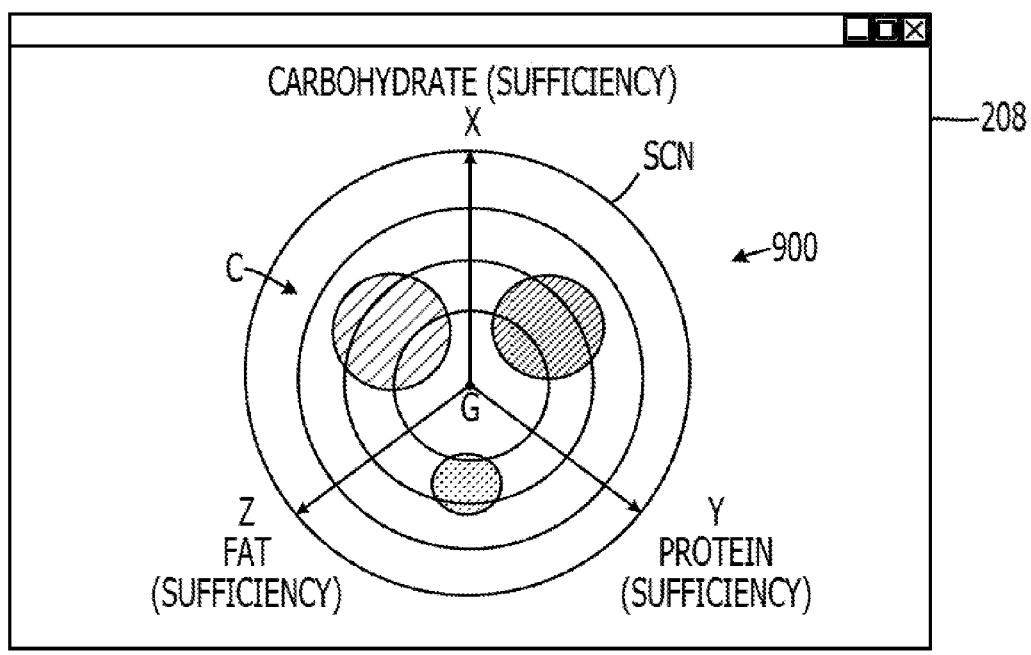
FIG. 9 illustrates a display example of a balance graph.

Here, an example of a balance graph displayed on the display 209 will be described. FIG. 9 illustrates a display example of the balance graph. In FIG. 9, a balance graph 900 in which the symbols S1 to S3 for the individual evaluation objects P1 to P3 are plotted in the coordinate system C plotted on the screen SCN is displayed on the display 209.

On the basis of the balance graph 900, the user can determine that, since the symbols S1 to S3 are plotted away from the origin G with respect to the evaluation objects P1 to P3, a nutrient balance relating to the carbohydrate, the protein, and the fat is poor. In addition, on the basis of the balance graph 900, the user can determine that, since the symbols S1 to S3 are large with respect to the evaluation objects P1 to P3, the degrees of sufficiency relating to the carbohydrate, the protein, and the fat, respectively, are low.

(Example of Time-Series Balance Graph)

Figure 10:
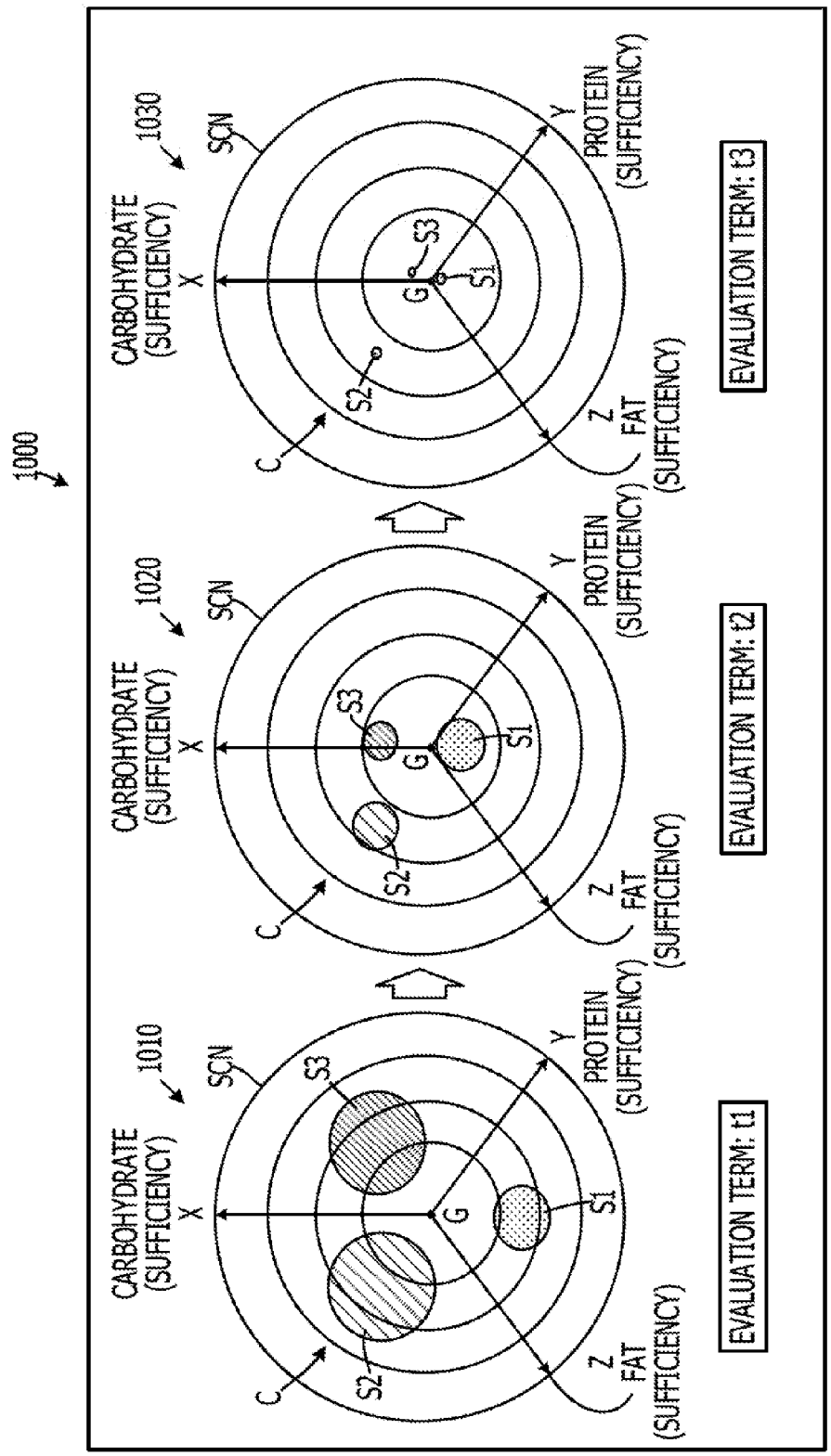
FIG. 10 illustrates a first example of a time-series balance graph.

Next, an example of a time-series balance graph will be described. FIG. 10 illustrates a first example of the time-series balance graph. In FIG. 10, a time-series balance graph 1000 illustrates balance graphs 1010 to 1030 corresponding to a time series (t1→t2→t3), in which the symbols S1 to S3 are plotted for the individual evaluation objects P1 to P3, respectively.

With respect to the evaluation objects P1 and P3, it can be determined on the basis of FIG. 10 that, since the symbols S1 and S3 are large and away from the origin G at the evaluation term t1, nutrient balances and the degrees of sufficiency are poor. In addition, since the symbols S1 and S3 become small and draw near the origin G as time elapses, it turns out that the diets of the evaluation objects P1 and P3 are improved in the nutrient balances and the degrees of sufficiency.

On the other hand, with respect to the evaluation object P2, it can be determined on the basis of FIG. 10 that, since the symbol S2 are large and away from the origin G at the evaluation term t1, a nutrient balance and the degrees of sufficiency are poor. In addition, since the symbol S2 becomes small as time elapses, it turns out that the degrees of sufficiency are improved. However, since the position of the symbol S2 changes only slightly on the screen SCN, it turns out that it is preferable that the nutrient balance is improved.

(Modification Example of Symbol)

Here, a modification example of a symbol will be described. In the example mentioned above, the case in which the size of the symbol Si varies in response to the distance Li has been described. Here, the case in which the type of the symbol Si varies in response to the distance Li will be described.

For example, the case in which the symbol Si varies from "x" to "Δ", and then to "○" (x→Δ→○) as the distance Li increases will be described. In addition, the distance Li at which the type of the symbol Si varies is preliminarily set and stored in a storage area such as the RAM 203, the magnetic disk 205, the optical disk 207, the flash memory 208 or the like.

Figure 11:
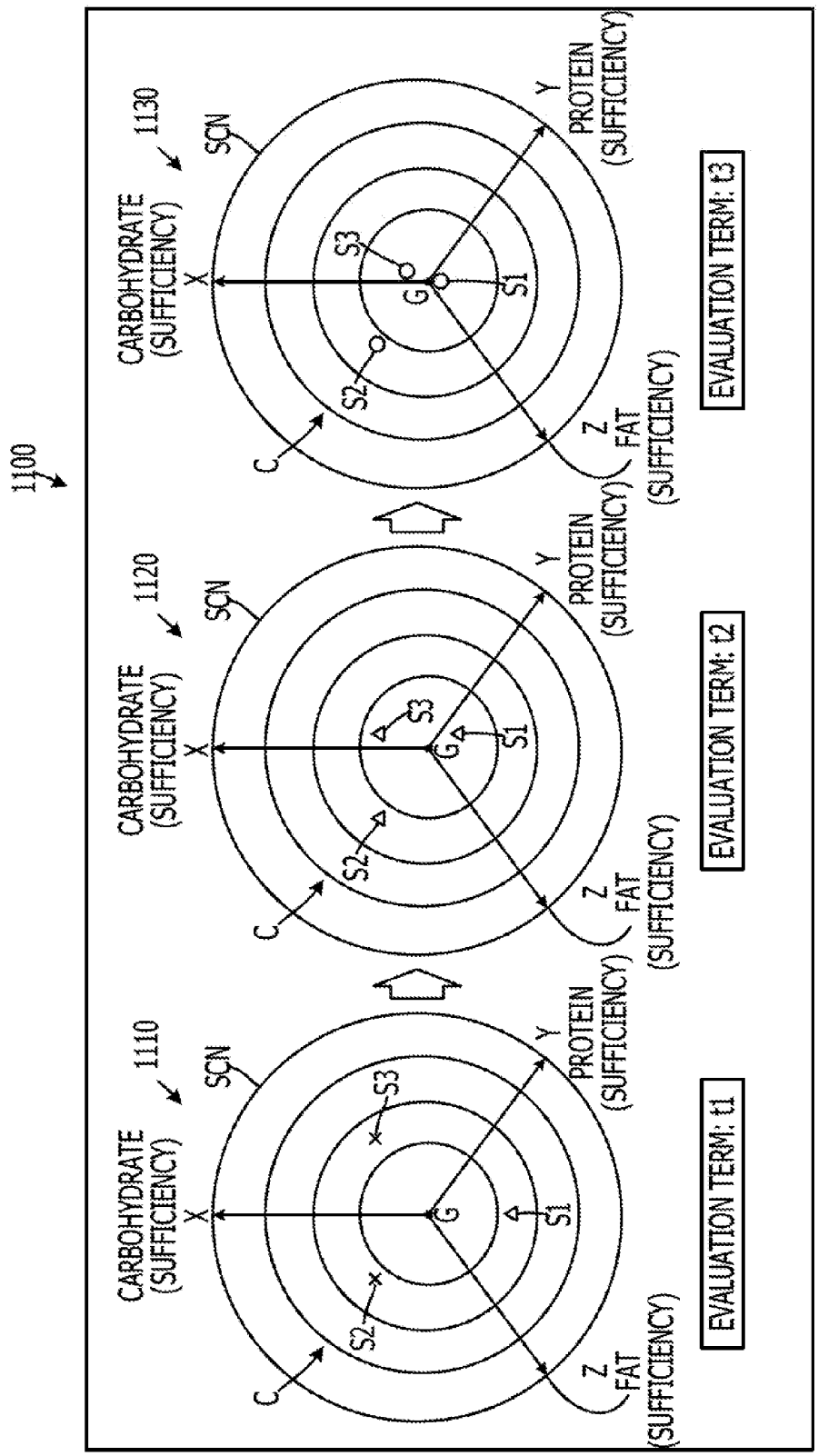
FIG. 11 illustrates a second example of a time-series balance graph.

FIG. 11 illustrates a second example of the time-series balance graph. In FIG. 11, a time-series balance graph 1100 illustrates in a time-series manner (t1→t2→t3) balance graphs 1110 to 1130 in which the symbols S1 to S3 arranged for the individual evaluation objects P1 to P3, respectively, are displayed on the screen SCN.

With respect to the evaluation objects P1 and P3, it can be determined on the basis of FIG. 11 that, since the symbols S1 and S3 are "Δ" and "x", respectively, and away from the origin G at the evaluation term t1, nutrient balances and the degrees of sufficiency are poor. In addition, since the types of the symbols S1 and S3 vary from "Δ" to "○" (Δ→○) and from "x" to "Δ", and then to "○" (x→Δ→○), respectively, and the symbols S1 and S3 draw near the origin G, as time elapses, it turns out that the diets of the evaluation objects P1 and P3 are improved in the nutrient balances and the degrees of sufficiency.

On the other hand, with respect to the evaluation object P2, it can be determined on the basis of FIG. 11 that, since the type of the symbol S2 is "x" and away from the origin G at the evaluation term t1, a nutrient balance and the degrees of sufficiency are poor. In addition, since the type of the symbol S2 varies from "x" to "Δ", and then to "○" (x→Δ→○) as time elapses, it turns out that the degrees of sufficiency are improved. However, since the position of the symbol S2 changes only slightly on the screen SCN, it turns out that it is preferable that the nutrient balance is improved.

(Modification Example of Angles Among Axes)

Figure 12:
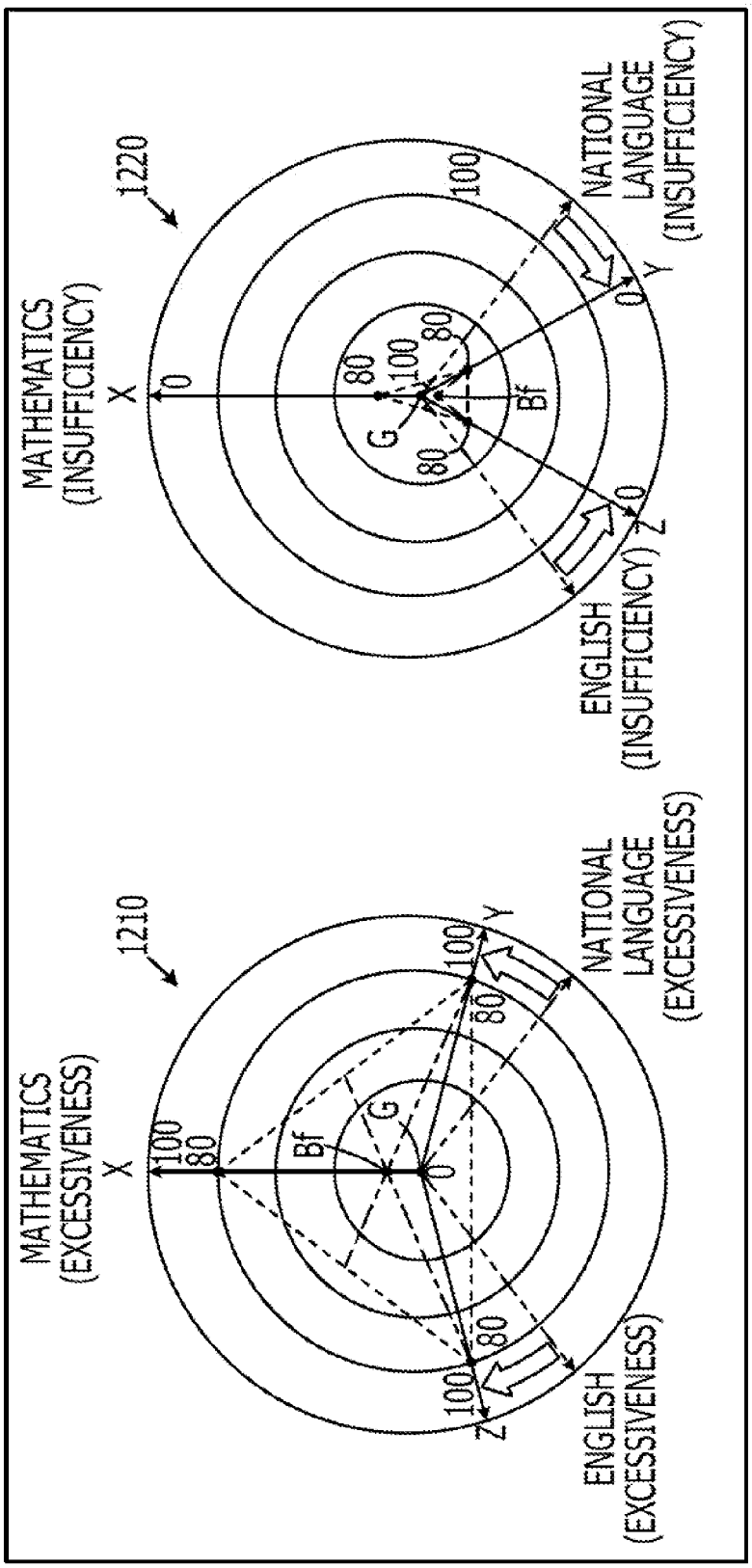
FIGS. 12A and 12B illustrate examples of a balance graph in which one of angles among axes is different from another of the angles among axes.

Next, the case in which angles among axes are not arranged evenly in the coordinate system C will be described. FIGS. 12A and 12B illustrate examples of the balance graph in which one of angles among axes is different from another of the angles among axes. In a balance graph 1210 in FIG. 12A, by enlarging an angle between a Y-axis and a Z-axis, a balance point Bf, located at the origin G in the case in which the angles among the axes are arranged evenly, moves to a point at which mathematics seems to be excessive.

In addition, in a balance graph 1220 in FIG. 12B, by reducing the angle between the Y-axis and the Z-axis, the balance point Bf, located at the origin G in the case in which the angles among the axes are arranged evenly, moves to a point at which English and national language seem to be insufficient. In this way, by adjusting the angles among the axes, the appearance of an evaluation result can be changed.

(Balance Graph Creation Processing Operation Procedures in Balance Graph Creation Device)

Next, an example of a balance graph creation processing operation procedures performed in the balance graph creation device 200 according to the embodiment will be described. Here, the case where the evaluation items H1 to H3 (refer to FIG. 4) are used as evaluation items and a balance graph that emphasizes the degrees of sufficiency relating to the evaluation items H1 to H3 is created will be described.

Figure 13:
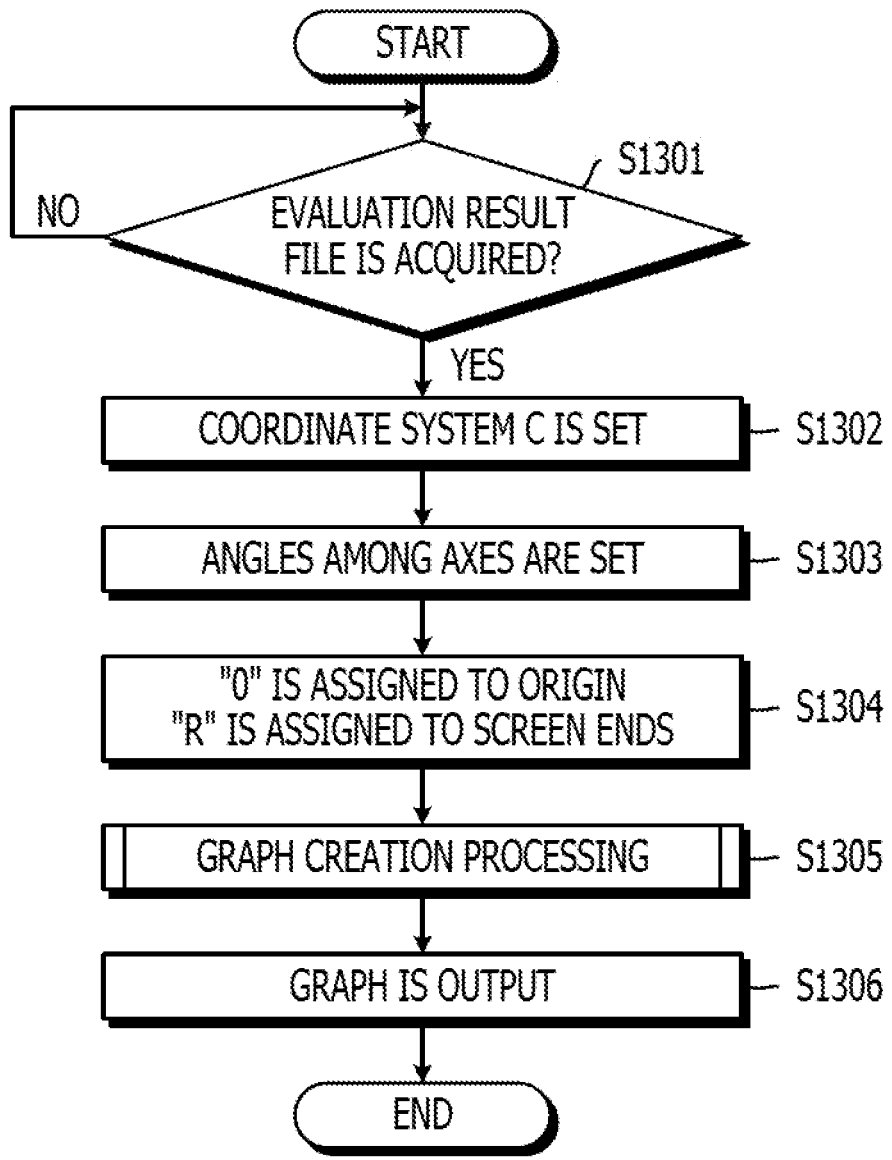
FIG. 13 is a flowchart illustrating an example of a whole picture of a balance graph creation processing operation performed in the balance graph creation device.

FIG. 13 is a flow graph illustrating an example of the balance graph creation processing operation procedures performed in the balance graph creation device. In FIG. 13, first, the acquisition section 301 determines whether or not an evaluation result file (for example, the evaluation result file 400), which includes the evaluation results relating to the multiple evaluation items, is acquired (at S1301).

Here, the acquisition section 301 waits for the acquisition of the evaluation result file (at S1301: No). In addition, when the evaluation result file is acquired (at S1301: Yes), the setup section 30 sets the coordinate system C on the screen SCN, by referring to the evaluation result file (at S1302). Here, the coordinate system C is a coordinate system in which the X-axis, the Y-axis, and the Z-axis, which correspond to the evaluation items H1 to H3, respectively, extend from the origin in a radial fashion.

After this, the setup section 302 sets angles among the axes in accordance with an angle pattern preliminarily set (at S1303). In addition, the angle pattern is stored in a storage area such as the RAM 203, the magnetic disk 205, the optical disk 207, the flash memory 208 or the like. In addition, the setup section 302 assigns "0" to the origin G and assigns the maximum values R of the evaluation results to the screen ends (at S1304). In this regard, here, it is assumed that the minimum values of the evaluation results are "0".

In addition, performed is a balance graph creation processing operation for creating a balance graph in which a balance among the evaluation results of the evaluation items for the evaluation object Pi is expressed (at S1305). The details of the processing operation will be described with reference to FIG. 14, later.

In addition, the output section 305 outputs the created balance graph (at S1306) and terminates the series of processing operations according to the flowchart.

Accordingly, using one point, the balance among the evaluation results of the multiple evaluation items for the evaluation object can be expressed in the coordinate system C. Therefore, visibility can be improved when the balances among the evaluation results of the multiple evaluation items are evaluated with respect to a plurality of evaluation objects. In addition, when a balance graph that emphasizes the degrees of insufficiency relating to the evaluation items H1 to H3 is created, the maximum values R of the evaluation results are assigned to the origin G in S1304 and a value "0" is assigned to the screen ends.

<Balance Graph Creation Processing>

Next, an example of a balance graph creation processing operation performed in S1305 shown in FIG. 13 will be described. FIG. 14 is a flowchart illustrating an example of the graph creation processing operation performed in S1305 in FIG. 13. In the flowchart in FIG. 14, first, the setup section 302 sets "i" to "1" (at S1401) and selects the evaluation object Pi from among evaluation result files (at S1402).

Next, in the coordinate system C, the setup section 302 sets a point xi, which indicates the evaluation result of the evaluation item H1, on the X-axis corresponding to the evaluation item H1 (at S1403). In addition, in the coordinate system C, the setup section 302 sets a point yi, which indicates the evaluation result of the evaluation item H2, on the Y-axis corresponding to the evaluation item H2 (at S1404).

Furthermore, in the coordinate system C, the setup section 302 sets a point zi, which indicates the evaluation result of the evaluation item H3, on the Z-axis corresponding to the evaluation item H3 (at S1405). Next, the determination section 303 specifies a point indicating the circumcenter of a triangular shape the vertices of which correspond to the points xi, yi, and zi (at S1406), and determines the specified point as the balance point Bi (at S1407).

In addition, by setting information in the fields of the evaluation object ID, the balance point, the coordinate, and the evaluation term in the graphic data table 500, the determination section 303 registers new graphic data as a record (at S1408).

After this, the creation section 304 calculates the distance Li between the balance point B1 and the individual points x1, y1, and z1 (at S1409), and calculates the distance variable ri, using the equation (1) (at S1410). In addition, the creation section 304 sets the calculated distance variable ri in the distance variable field of a corresponding record in the graphic data table 500 (at S1411).

Next, the setup section 302 determines whether or not "i" is equal to "n" (at S1412). In addition, when "i" is not equal to "n" (at S1412: No), the setup section 302 increments "i" (at S1413) and the processing operation returns to S1402. On the other hand, when "i" is equal to "n" (at S1412: Yes), the creation section 304 selects an arbitrary symbol from the symbol table 600 (at S1414).

In addition, the creation section 304 refers to the graphic data table 500 and plots the coordinate system C, set on the screen SCN by the setup section 302, and the symbols Si on the coordinate system C, using the symbols selected by the setup section 302, the symbols Si corresponding to the evaluation objects Pi respectively. Accordingly, a balance graph is created (at S1415), and the processing operation proceeds to S1306 shown in FIG. 13.

Accordingly, in the coordinate system C, a balance graph in which balances among the evaluation results of the evaluation items for the individual evaluation objects Pi are expressed is created. In addition, when a balance graph that emphasizes the degrees of insufficiency relating to the evaluation items H1 to H3 is created, the distance variable ri may be calculated in S1410, using the equation (2).

As described above, according to the embodiment, a point (balance point), which indicates a balance among the evaluation results of the multiple evaluation items for an evaluation object, can be expressed in the coordinate system C, using points that are plotted on the axes corresponding to the multiple evaluation items for the evaluation object, respectively, the points indicating the evaluation results of the individual evaluation items. Accordingly, visibility can be improved when, with respect to a plurality of evaluation objects, the balances among the evaluation results of the multiple evaluation items are evaluated in one drawing.

In addition, according to the embodiment, a balance graph is created in which, with respect to each of the plurality of evaluation objects, one of the center, the circumcenter, the incenter, the orthocenter, and the excenter of a polygon the vertices of which correspond to a plurality of points is plotted as a balance point, the plurality of points being plotted on axes, which correspond to individual evaluation items, respectively, and indicating the evaluation results of the individual evaluation items, respectively. Accordingly, the balances among the evaluation results of the multiple evaluation items can be suitably expressed with respect to the evaluation objects.

In addition, according to the embodiment, the balance graph is created where a symbol the center of which corresponds to the balance point is plotted in the coordinate system C. Accordingly, by using an arbitrary figure, an arbitrary symbol, an arbitrary character or the like, the position of the balance point can be expressed so as to be understandable to the user.

In addition, according to the embodiment, on the basis of distances between the balance point and the individual points that are plotted on the individual axes and indicate the evaluation results, the size of the symbol is determined. Accordingly, even if the positions of balance points for different evaluation objects are overlapped, the visibility of a difference between evaluation results can be improved.

In addition, according to the embodiment, on the basis of distances between the balance point and the individual points that are plotted on the individual axes and indicate the evaluation results, a color (brightness and color saturation are included) used when the symbol Si is plotted is determined. Accordingly, even if symbols are overlapped, the visibility of the individual symbols can be improved.

In addition, according to the embodiment, when it is assumed that the degrees of sufficiency increase linearly with the values of the evaluation results relating to the evaluation items, the minimum values of the evaluation results relating to the evaluation items are assigned to the origin, and the maximum values of the evaluation results are assigned to the other end points, different from the origins of the individual axes, in the coordinate system C. Accordingly, a balance graph that emphasizes the degrees of sufficiency relating to the individual evaluation items can be created.

In addition, according to the embodiment, when it is assumed that the degrees of sufficiency increase linearly with the values of the evaluation results relating to the evaluation items, the maximum values of the evaluation results relating to the evaluation items are assigned to the origin, and the minimum values of the evaluation results are assigned to the other end points, different from the origins of the individual axes, in the coordinate system C. Accordingly, a balance graph that emphasizes the degrees of insufficiency relating to the individual evaluation items can be created.

In addition, according to the embodiment, a time-series graph is created where a plurality of graphs for the evaluation object, which have different evaluation terms, are arranged in a time-series manner. Accordingly, when it is determined how the balance among the evaluation results of the multiple evaluation items for the evaluation object shifts as time elapses, the user's intuitive understanding can be supported.

In this way, according to the balance graph creation method, the balance graph creation program, and the balance graph creation device of the embodiment, visibility can be improved when, with respect to a plurality of evaluation objects, the balances among the evaluation results of the multiple evaluation items are evaluated in one graph. In addition, the user's intuitive understanding can be supported when the tendencies of the balances among the multiple evaluation items for all the evaluation objects are determined.

In addition, the balance graph creation method described in the embodiment can be realized by executing a preliminarily prepared program in a computer such as a personal computer, a workstation or the like having one or more processors therein for such executing. The balance graph creation program according to the embodiment is stored in a computer-readable recording medium such as a hard disk, a flexible disk, a CD-ROM, an MO, a DVD, a USB memory or the like, and is read out to be executed by the computer. In addition, the balance graph creation program according to the embodiment may be distributed through a network such as Internet or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A graph creation method, comprising:
acquiring, using a processor, a plurality of values corresponding to each of a plurality items that are evaluated for each of a plurality of evaluation objects;
determining, using the processor, a point for each of the plurality of evaluation objects in a coordinate system that has a plurality of axes corresponding to the plurality of items, based on the plurality of values the point being one of a center, a circumcenter, an incenter, an orthocenter, and an excenter of a polygon which has a plurality of axes;
determining, using the processor, at least one of a size, a color and a shape of a symbol based on a distance between the point and at least two of the plurality of values in the coordinate system; and
creating, using the processor, a graph where the symbol is plotted at a position corresponding to the point in the coordinate system.

2. The graph creation method according to claim 1, further comprising:
assigning, using the processor, one of minimum values and maximum values available in a first evaluation result, a second evaluation result, and a third evaluation result to origins of a first axis, a second axis, and a third axis, respectively;
assigning, using the processor, the other of minimum values and maximum values available in the first evaluation result, the second evaluation result, and the third evaluation result to end points of the first axis, the second axis, and the third axis, respectively; and
setting, using the processor, the coordinate system in which the first axis, the second axis, and the third axis extend from the origin in a radial fashion.

3. The graph creation method according to claim 1, further comprising:
creating, using the processor, a time-series graph where a plurality of the graphs for the evaluation object, which are created in the creating the graph and having different evaluation terms, are arranged in a time-series manner.

4. A graph creation device, comprising:
a memory; and
a processor coupled to the memory and configured to:
acquire a plurality of values, corresponding to each of a plurality items that are evaluated for each of a plurality of evaluation objects;
determine a point for each of the plurality of evaluation objects in a coordinate system that has a plurality of axes corresponding to the plurality of items, based on the plurality of values the point being one of a center, a circumcenter, an incenter, an orthocenter, and an excenter of a polygon which has the plurality of axes;

determine at least one of a size, a color and a shape of a symbol based on a distance between the point and at least two of the plurality of values in the coordinate system; and create a graph where the symbol is plotted at a position corresponding to the point in the coordinate system.

5. The graph creation device according to claim 4, wherein the processor is configured to:

assign one of minimum values and maximum values available in a first evaluation result, a second evaluation result, and a third evaluation result to origins of a first axis, a second axis, and a third axis, respectively;

assign the other of minimum values and maximum values available in the first evaluation result, the second evaluation result, and the third evaluation result to end points of the first axis, the second axis, and the third axis, respectively; and set the coordinate system in which the first axis, the second axis, and the third axis extend from the origin in a radial fashion.

6. The graph creation device according to claim 4, wherein the processor is configured to create a time-series graph where a plurality of the graphs for the evaluation object, which are created in the creating the graph and have different evaluation terms, are arranged in a time-series manner.

7. A non-transitory computer readable recording medium, having recorded thereon a graph creation program for causing a computer to perform a process, the process comprising:

acquiring, using a processor, a plurality of values corresponding to each of a plurality items that are evaluated for each of a plurality of evaluation objects;

determining, using the processor, a point for each of the plurality of evaluation objects a coordinate system that has a plurality of axes corresponding to the plurality of items, based on the plurality of values the point being one of a center, a circumcenter, an incenter, an orthocenter, and an excenter of a polygon which has a plurality of axes;

determining, using the processor, at least one of a size, a color and a shape of a symbol based on a distance between the point and at least two of the plurality of values in the coordinate system;

creating, using the processor, a graph where the symbol is plotted at a position corresponding to the point in the coordinate system.

8. The non-transitory computer readable recording medium according to claim 7, wherein the process further comprising:

assigning, using the processor, one of minimum values and maximum values available in a first evaluation result, a second evaluation result, and a third evaluation result to origins of a first axis, a second axis, and a third axis, respectively;

assigning, using the processor, the other of minimum values and maximum values available in the first evaluation result, the second evaluation result, and the third evaluation result to end points of the first axis, the second axis, and the third axis, respectively; and setting, using the processor, the coordinate system in which the first axis, the second axis, and the third axis extend from the origin in a radial fashion.

9. The non-transitory computer readable recording medium according to claim 7, the process further comprising:

creating, using the processor, a time-series graph where a plurality of the graphs for the evaluation object, which are created in the creating the graph and having different evaluation terms, are arranged in a time-series manner.

* * * * *